US008306806B2

(12) United States Patent
Shi et al.

(10) Patent No.: US 8,306,806 B2
(45) Date of Patent: Nov. 6, 2012

(54) ADAPTIVE WEB MINING OF BILINGUAL LEXICON

(75) Inventors: Lei Shi, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 12/326,168

(22) Filed: Dec. 2, 2008

(65) Prior Publication Data

US 2010/0138211 A1 Jun. 3, 2010

(51) Int. Cl.
*G06F 17/28* (2006.01)
*G06F 17/27* (2006.01)

(52) U.S. Cl. .................................. 704/3; 704/9
(58) Field of Classification Search .............. 704/1–10
See application file for complete search history.

(56) References Cited

U.S. PATENT DOCUMENTS

| 5,907,821 | A  | * | 5/1999  | Kaji et al. .................... 704/4 |
| 7,356,457 | B2 |   | 4/2008  | Pinkham et al. |
| 2003/0204400 | A1 |   | 10/2003 | Marcu et al. |
| 2005/0021323 | A1 | * | 1/2005  | Li ................................... 704/5 |
| 2005/0108630 | A1 |   | 5/2005  | Wasson et al. |
| 2006/0085190 | A1 | * | 4/2006  | Gunawardana et al. ... 704/256.3 |
| 2008/0010056 | A1 |   | 1/2008  | Zhou et al. |
| 2008/0126074 | A1 |   | 5/2008  | Whitelock et al. |
| 2008/0162117 | A1 |   | 7/2008  | Bangalore et al. |

OTHER PUBLICATIONS

Kwok et al. "Chinet: a Chinese Name Finder System for Document Triage", Proceedings of 2005 International Conference on Intelligence Analysis, 2005.*

Rapp, Reinhard, Automatic identification of word translations from unrelated English and German corpora. In Proceedings of the 37th Annual Meeting of the Association for Computational Linguistics, Maryland, 1999.*

Allan, et al., "Challenges in Information Retrieval and Language Modeling", retrieved on Sep. 29, 2008 at <<http://www.sigir.org/forum/S2003/ir-challenges2.pdf>>, Center for Intelligent Information Retrieval Workshop, Sep. 2002, pp. 1-17.

Berger, et al., "A Maximum Entropy Approach to Natural Language Processing", retrieved on Sep. 29, 2008 at <<http://www.aclweb.org/anthology-new/J/J96/J96-1002.pdf>>, Association for Computational Linguistics, vol. 22, No. 1, 1996, pp. 39-71.

Brown, et al., "The Mathematics of Statistical Machine Translation: Parameter Estimation", retrieved on Sep. 29, 2008 at <<http://acl.ldc.upenn.edu/J/J93/J93-2003.pdf>>, Association for Computational Linguistics, vol. 19, No. 2, 1993, pp. 263-311.

(Continued)

*Primary Examiner* — Samuel G Neway
(74) *Attorney, Agent, or Firm* — Lee & Hayes, PLLC

(57) ABSTRACT

Embodiments for the adaptive mining of bilingual lexicon are disclosed. In accordance with one embodiment, the adaptive mining of bilingual lexicon includes retrieving one or more bilingual web pages, wherein each of the bilingual web page including a search term and one or more additional terms. The adaptive mining also includes forming a plurality of candidate translation pairs for each of the terms and extracting one or more translation layout patterns from the plurality of candidate translation pairs. The adaptive mining further includes deriving a term translation in a second language for the search term. The term translation being derived based on a hidden conditional random field (HCRF) model that includes the one or more candidate translations, the one or more translation layout patterns, and one or more additional features. The term translation is further stored in a lexicon repository.

20 Claims, 7 Drawing Sheets

OTHER PUBLICATIONS

Cheng, et al., "Translating Unknown Queries with Web Corpora for Cross-Language Information Retrieval", retrieved on Sep. 29, 2008 at <<http://wkd.iis.sinica.edu.tw/~lfchien/publication/sigir04.pdf>>, ACM 1-58113-881-4/04/0007 (SIGIR'04), Jul. 25, 2004, pp. 1-8.

Dempster, et al., "Maximum Likelihood from Incomplete Data via the EM Algorithm", retrieved on Sep. 29, 2008 at <<http://www.biostat.jhsph.edu/~yonchen/EM.pdf, Journal of the Royal Statistical Society. Series B (Methodological), vol. 39, No. 1, 1977, pp. 1-38.

Fung, et al., "An IR Approach for Translating New Words from Nonparallel, Comparable Texts", retrieved on Sep. 29, 2008 at <<http://delivery.acm.org/10.1145/990000/980916/p414-fung.pdf?key1=980916&key2=3811862221&coll=GUIDE&dl=&CFID=4335980&CFTOKEN=95459845>>, Association for Computational Linguistics (ACL-36), vol. 1, Aug. 1998, pp. 414-420.

Gunawardana, et al., "Hidden Conditional Random Fields for Phone Classification", retrieved on Sep. 29, 2008 at <<http://research.microsoft.com/~aselag/pubs/gunawardana05_hidden_condit_random_field_phone_class.pdf>>, International Speech Communication Association (International Conference on Speech Communication and Technology), Sep. 2005, pp. 1-4.

Huang, et al., "Mining Key Phrase Translations from Web Corpora", retrieved on Sep. 29, 2008 at <<http://delivery.acm.org/10.1145/1230000/1220636/p483-huang.pdf?key1=1220636&key2=7341862221&coll=GUIDE&dl=GUIDE&CFID=4336383&CFTOKEN=98350184>>, Association for Computational Linguistics (HLT/EMNLP), Oct. 2005, pp. 483-490.

Kitamura, et al., "Practical Machine Translation System allowing Complex Patterns", retrieved on Sep. 29, 2008 at <<http://www.amtaweb.org/summit/MTSummit/FinalPapers/59-Kitamura-final.pdf>>, MTSummit, pp. 1-8.

Lafferty, et al., "Conditional Random Fields: Probabilistic Models for Segmenting and Labeling Sequence Data", retrieved on Sep. 29, 2008 at <<http://www.cis.upenn.edu/~pereira/papers/crf.pdf>>, 18th International Conference on Machine Learning, Jun. 28, 2001, pp. 282-289.

Liu, "Web Content Mining", retrieved on Sep. 29, 2008 at <<http://www.cs.uic.edu/~liub/Web-Content-Mining-2.pdf>>, WWW-2005, May 10, 2005, pp. 2-165.

Lu, et al., "Anchor Text Mining for Translation of Web Queries: A Transitive Translation Approach", retrieved on Sep. 29, 2008 at <<http://delivery.acm.org/10.1145/990000/984324/p242-lu.pdf?key1=984324&key2=7571862221&coll=GUIDE&dl=GUIDE&CFID=4447696&CFTOKEN=73963681>>, ACM 1046-8188/04/0400-0242, vol. 22, No. 2, Apr. 2004, pp. 242-269.

Mahajan, et al., "Training Algorithms for Hidden Conditional Random Fields", retrieved on Sep. 29, 2008 at <<http://research.microsoft.com/~aselag/pubs/mahajan06_train_algor_condit_random_field.pdf>>, IEEE (ICASSP 2006), 1-4244-0469-X, vol. 1, 2006, pp. 273-276.

McEwan, et al., "Building Bilingual Dictionaries from Parallel Web Documents", retrieved on Sep. 29, 2008 at <<http://citeseerx.ist.psu.edu/viewdoc/download?doi=10.1.1.3.457&rep=rep1&type=pdf>>, Springer-Verlag (Proceedings of ECIR), 2002, pp. 303-323.

Nagata, et al., "Using theWeb as a Bilingual Dictionary", retrieved on Sep. 29, 2008 at <<http://www.aclweb.org/anthology-new/W/W01/W01-1413.pdf, Association for Computational Linguistics (CLIF), 2001, pp. WO1-1433-1441.

Nie, et al., "Cross-Language Information Retrieval Based on Parallel Texts and Automatic Mining of Parallel Texts from the Web", retrieved on Sep. 29, 2008 at <<http://delivery.acm.org/10.1145/320000/312656/p74-nie.pdf?key1=312656&key2=3462862221&coll=GUIDE&dl=GUIDE&CFID=4338197&CFTOKEN=39078907>>, ACM 1-58113-096-1/99/0007 (SIGIR), Aug. 1999, pp. 74-81.

Pu et al., "Subject Categorization of Query Terms for Exploring Web Users' Search Interests", Journal of American Society for Information Science and Technology, 2002, 53(8), pp. 617-630.

Quattoni et al., "Hidden Conditional Random Fields", IEEE, Transactions on Pattern Analysis and Machine Intelligence, vol. 29, No. 10, Oct 2007, 6 pgs.

Resnik, "Mining the Web for Bilingual Text", retrieved on Sep. 29, 2008 at <<http://delivery.acm.org/10.1145/1040000/1034757/p527-resnik.pdf?key1=1034757&key2=9413862221&coll=GUIDE&dl=GUIDE&CFID=4338865&CFTOKEN=21955711>>, ACM 10.3115/1034678-1034757, 37th Annual Meeting on Computational Linguistics, Jun. 20, 1999, pp. 527-534.

Shi, et al., "A DOM Tree Alignment Model for Mining Parallel Data from the Web", retrieved on Sep. 29, 2008 at <<http://research.microsoft.com/~jfgao/paper/treeAlignment-ACL2006-camera-version.pdf>>, Association for Computational Linguistics, 2006, pp. 1-8.

Silverstein, et al., "Analysis of a Very Large AltaVista Query Log", retrieved on Sep. 29, 2008 at http://citeseerx.ist.psu.edu/viewdoc/download?doi=10.1.1.54.241&rep=rep1&type=pdf>>, Digital Equipment Corporation, SRC Technical Note (1998-014), Oct. 26, 1998, pp. 1-18.

Simoes, et al., "Parallel Corpora based Translation Resources Extraction", retrieved on Sep. 29, 2008 at <<http://www.sepin.org/revistaSEPLN/revista/39/32.pdf>>, Sociedad Espanola para el Procesamiento del Lenguaje Natural, No. 39, 2007, pp. 265-272.

"The Lemur Toolkit for Language Modeling and Information Retrieval", available as early as Sep. 29, 2008 at <<http://www.lemurproject.org>>, Advanced Research and Development Activity in Information Technology (ARDA), pp. 1-2.

Turcato, "Automatically Creating Bilingual Lexicons for Machine Translation from Bilingual Text", retrieved on Sep. 29, 2008 at <<http://delivery.acm.org/10.1145/990000/980781/p1299-turcato.pdf?key1=980781&key2=6463862221&coll=GUIDE&dl=&CFID=4339544&CFTOKEN=41099421>>, Association for Computational Linguistics (ACL-36), vol. 2, Aug. 1998, pp. 1299-1306.

Wu, et al., "Learning Source-Target Surface Patterns for Web-based Terminology Translation", retrieved Sep. 29, 2008 at <<http://delivery.acm.org/10.1145/1230000/1225763/p37-wu.pdf?key1=1225763&key2=3873862221&coll=GUIDE&dl=GUIDE&CFID=4339700&CFTOKEN=61819608>>, Association for Computational Linguistics, Jun. 2005, pp. 37-40.

Zhang, et al., "Detection and Translation of OOV Terms Prior to Query Time", retrieved on Sep. 29, 2008 at <<http://delivery.acm.org/10.1145/1010000/1009102/p524-zhang.pdf?key1=1009102&key2=5404862221&coll=GUIDE&dl=GUIDE&CFID=4450798&CFTOKEN=23338627>>, ACM 1-58113-881-4/04/0007 (SIGIR'04), Jul. 25, 2004, pp. 524-525.

Zhang, et al., "Using the Web for Automated Translation Extraction in Cross-Language Information Retrieval", retrieved on Sep. 29, 2008 at <<http://delivery.acm.org/10.1145/1010000/1009022/p162-zhang.pdf?key1=1009022&key2=0514862221&coll=GUIDE&dl=GUIDE&CFID=4340188&CFTOKEN=22084649>>, ACM 1-58113-881-4/04/0007 (SIGIR'04), Jul. 25, 2004, pp. 162-169.

Zhou, et al., "Ambiguity and Unknown Term Translation in CLIR", retrieved on Sep. 29, 2008 at <<http://www.clefcampaign.org/2007/working_notes/dong_zhouCLEF2007.pdf>>, CLEF, 2007, pp. 1-5.

Zhou, et al., "NTCIR-6 Experiments using Pattern Matched Translation Extraction", retrieved on Sep. 29, 2008 at <<http://research.nii.ac.jp/ntcir/workshop/OnlineProceedings6/NTCIR/21.pdf>>, NTCIR-6 Workshop, May 15, 2007, pp. 145-151.

* cited by examiner

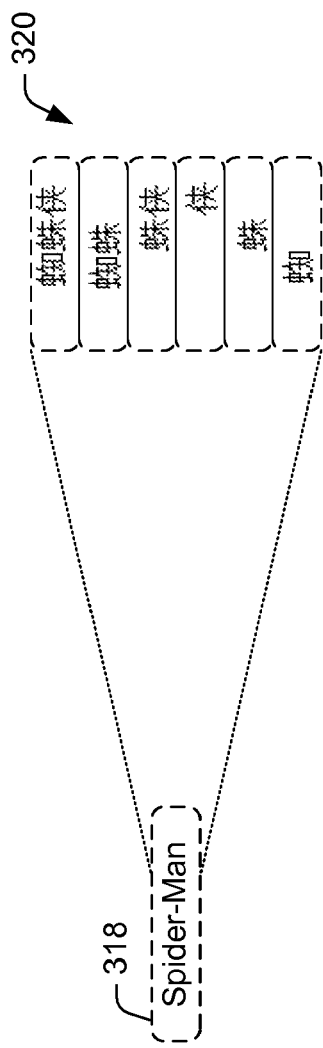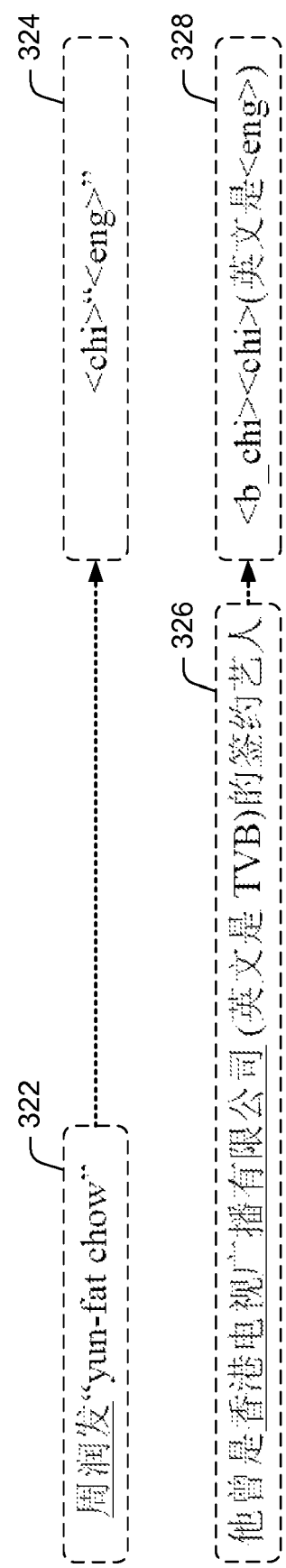
Figure 3c
Figure 3d

ADAPTIVE WEB MINING OF BILINGUAL LEXICON

BACKGROUND

Many multi-lingual applications, such as machine translation or cross-language information retrieval software, require bilingual lexicon to produced desired translation results. However, manually compiled bilingual dictionaries are often inadequate to serve this purpose due to their limited coverage. For example, machine translation or cross-language information retrieval software may be unable to correctly translate a first term written in a first language to a second term of the same meaning in a second language due to the fact that the first term is not in the presently used bilingual dictionary. Such terms may be referred to as Out-Of-Vocabulary (OOV) terms. These OOV terms may severally deteriorate the quality of a machine translated document, or drastically hinder the ability of cross-language information retrieval software to retrieve relevant data.

With a sharp increase of bilingual pages (web pages with content in at two or more languages), web mining of term translations, that is, a term in a first language proximately located to a translation of the term in a second language, can greatly alleviate this problem. Current web mining methods may rely heavily on co-occurrence statistics. However, such methods are often unreliable in extracting low frequency term translations or term translations that occur only in a few web pages on the World Wide Web. Such unreliability is generally due to the fact that low frequency term translations are often hard to find using search engines, as well as due to the fact that low frequency term translations are more likely to be subject to noise during mining. Since the majority of term translations available on the Web are in fact low frequency term translations, current web mining methods are ill suited for large scale mining.

In other instances, some web mining methods may manually define a set of pattern rules to extract term translations from web pages, as layout patterns of term translations on a single web page tend to occur in similar patterns. However, a major problem of these methods is that the layout patterns of term translations may vary from web page to web page, so that the use of a fixed set of pattern rules cannot cover all bilingual web pages and often extract noise from non-bilingual pages.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments of various extraction technologies for adaptively learning extraction pattern rules of each bilingual web page to facilitate the mining of bilingual lexicon, that is, term translations, from a plurality of web pages. The various implementations may regard term translation mining on the bilingual web page as a sequence labeling task, and conditional random field (CRF) techniques may be employed to solve the sequence labeling tasks. Further, since a bilingual web page may have multiple patterns, the adaptively learned pattern rules from a bilingual page are treated as a hidden variable in the CRF, which is then referred to as Hidden Conditional Random Field (HCRF). With HCRF, the extraction technologies are able to accommodate multiple extraction patterns in the same page so that the mining precision and recall are further improved, and the manual definition of pattern rules may be avoided.

In one embodiment, the adaptive mining of bilingual lexicon includes retrieving one or more bilingual web pages, wherein each of the bilingual web pages includes a search term and one or more additional terms. The adaptive mining also includes forming a plurality of candidate translation pairs for each of the terms and extracting one or more translation layout patterns from the plurality of candidate translation pairs. The adaptive mining further includes deriving a term translation in a second language for the search term. The term translation is derived based on a hidden conditional random field (HCRF) model that includes the one or more candidate translations, the one or more translation layout patterns, and one or more additional features. The term translation is further stored in a lexicon repository.

Other embodiments will become more apparent from the following detailed description when taken in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 3c illustrates an exemplary generation of candidate translations for a search term by a computing environment for bilingual lexicon extraction, in accordance with various embodiments.

FIG. 3d illustrates exemplary extracted candidate layout patterns by a computing environment for bilingual lexicon extraction, in accordance with various embodiments.

DETAILED DESCRIPTION

Figure 1:
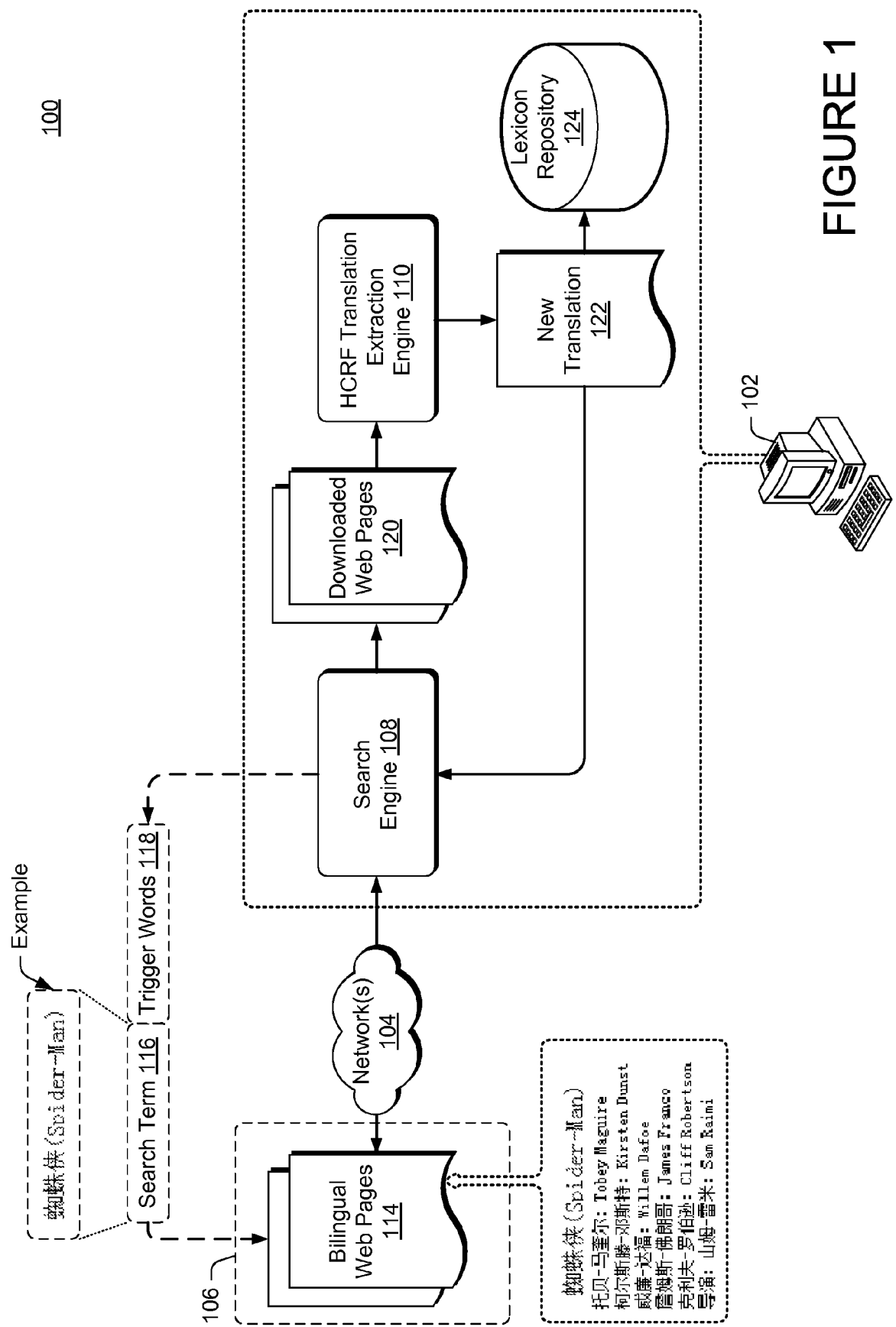
FIG. 1 shows a simplified block diagram that illustrates a computing environment for adaptive web mining of bilingual lexicon, in accordance with various embodiments.

This disclosure is directed to a translation mining application that adaptively mines bilingual lexicon from web pages on the World Wide Web, also referred to herein as the "Web". A translation mining application in accordance with the embodiments is able to adaptively learn pattern rules of translation pairs in each bilingual web page. As used herein, "bilingual web page" refers to a web page that includes words in at least two different languages (e.g., a predominately Chinese web page that is interlaced with English words). However, "bilingual web page", as used herein, may also include a web page that comprises words in more than two languages, provided that the web page includes words in at least two languages of interest (e.g., a predominately Chinese web page that is interlaced with both English and French words).

Generally, a translation pair refers to a pair of terms that consists of a first language term, and a corresponding second language term that has the same or similar meaning. A pattern rule defines the placement of the first language term to the corresponding second language term of the same or similar meaning in a particular web page. For example, "Hello (Hola)" is a translation pair, where "Hello" is in the first language (English), and "Hola" is in the second language (Spanish). Moreover, in this example, the pattern rule may be the fact that a term in the first language, "Hello", is separated from a term of the same meaning in the second language, "Hola", by a space " " and an opening prentice, "(". In another example, "Goodbye: Au revoir" is another translation pair, where "Goodbye" is in the first language (English), and "Au revoir" is in the second language (French). Likewise, the pattern rule for this particular translation pair is that the term in the first language, "Goodbye" is separated from a term of the same meaning in the second language, "Au revoir", by a colon punctuation mark, ":", and a space " ".

Thus, the ability to adaptively learn pattern rules of translation pairs may provide good coverage and precision in finding the correct translation pairs, and eliminate the need to manually determine and define pattern rules. Additionally, a translation mining application in accordance with the various embodiments is configured to regard term translation mining on each bilingual web page as a single sequence labeling task to be solved by conditional random field (CRF). Moreover, since a bilingual web page may have multiple patterns, the adaptively learned pattern rules from a bilingual web page may be treated as a hidden variable in the CRF, resulting in a hidden condition random field (HCRF). Thus, with the use of HCRF, the translation mining application is able to accommodate multiple extraction patterns in the same bilingual web page. In turn, mining precision and extraction of the appropriate translation for a term may be further improved. Various examples of adaptive web mining of bilingual lexicon in accordance with the embodiments are described below with reference to FIGS. 1-6.

Exemplary Scheme

FIG. 1 illustrates a computing environment 100 for bilingual lexicon extraction, in accordance with various embodiments. The computing environment 100 may include a computing device 102. The client 102 may be any computing device that has network access capabilities, e.g., a desktop computer, a laptop computer, a tablet computer, mobile phone, etc. In turn, the computing device 102 is connected to one or more networks 104. The one or more networks 104 may include at least one of wide-area networks (WANs), local area networks (LANs), and/or other network architectures, that connect the computing device 102 to the World Wide Web 106.

The computing device 102 may include software application components such as a search engine 108, a Hidden Conditional Random Field (HCRF) translation extraction module 110, and a lexicon repository 112 that perform adaptive web mining of bilingual lexicon. Generally speaking, mining term translations from the Web involve two main steps: (1) locate bilingual web pages that hold translation pairs; and (2) extract term translations from the bilingual web pages. These steps may be accomplished by the search engine 108 and the translation extraction module 110.

In various embodiments, the search engine 106 may use the network 104 to transmit a query to the Web 106, whereby the query is for bilingual web pages 114 that contain the search term 116. In some embodiments, the search term 116 may be a term in a first language that is to be translated to a second language. For example, a user may provide a query that includes the actor name "Tobey Maguire" as the search term 116 when the user desires to find a Chinese translation of the actor's name in English.

In other embodiments, the search term 116 may be a translation pair. For example, when a user is unsure of a particular second language translation of a term in a first language, the user may input the term and the translation as a translation pair. In such an example, the user may be unsure of the translation because the translation is a literal translation that the user constructed after consulting an ordinary bilingual dictionary. Thus, the literal translation may or may not be a completely accurate translation and/or a commonly accepted translation. A search term 116 that is a Chinese-English translation pair for the English movie title "Spider-Man" is illustrated in FIG. 1.

In additional embodiments, the search term 116 may be paired with trigger words 118. The trigger words 118 are words that may trigger the search engine 106 to specifically include bilingual web pages 114 in queries. For example, but not as a limitation, when the search engine 108 is used to query the Web 106 for a Chinese translation of the English name (search term) "Tobey Maguire", the user who initiated the query may include the trigger words "English and Chinese translation" to better target the query to look for bilingual web pages 114 that may contain a translation pair of the English name "Tobey Maguire" and its Chinese counterpart in Chinese characters (shown in FIG. 1). However, it will be appreciated that a search term query, as well as the supplement of a search term with trigger words, may be carried out in any language to achieve the desired result.

The search engine 108 may find one or more bilingual web pages 114 that match the query that includes search term 116 and optionally, the trigger words 118. Subsequently, the search engine 108 may retrieve the one or more bilingual web pages 114 over the network 104 as downloaded web pages 120. In various embodiments, the one or more retrieved bilingual web pages may be downloaded to a data storage cache of the computing device 102. Following the download, the HCRF translation extraction module 110 may use Hidden Conditional Random Field in combination with adaptive pattern rule learning to extract a term translation, or a translation 122, for the search term 116 from the downloaded web pages 120. Term translation extraction generally involves the extraction of a second language translation that has the same meaning as the search term 116 of the first language. As further described below, the HCRF translation extraction module 110 may extract the new translation 122 by using the fact that a particular bilingual web page generally contains other first language terms in addition to the search term 116. Following the extraction of the translation 122, the computing device 102 may save the translation 122 into a special portion of its data storage cache, such as the lexicon repository 124, for later use.

In further embodiments, the computing device 102 may be configured to further provide the translation 122 back into the search engine 108 as a seed pair to query for new translation pairs. The use of translation 122 as a seed pair may lead other related translation pairs on the previously found bilingual web pages 114 and/or on additional bilingual web pages 114. In these embodiments, the feeding of translation 122 as a seed pair back into search engine 108 may be repeated recursively for a predetermined number of cycles, or repeated recursively until no additional translations 122 for the search term 116 may be found.

Exemplary Components

Figure 2:
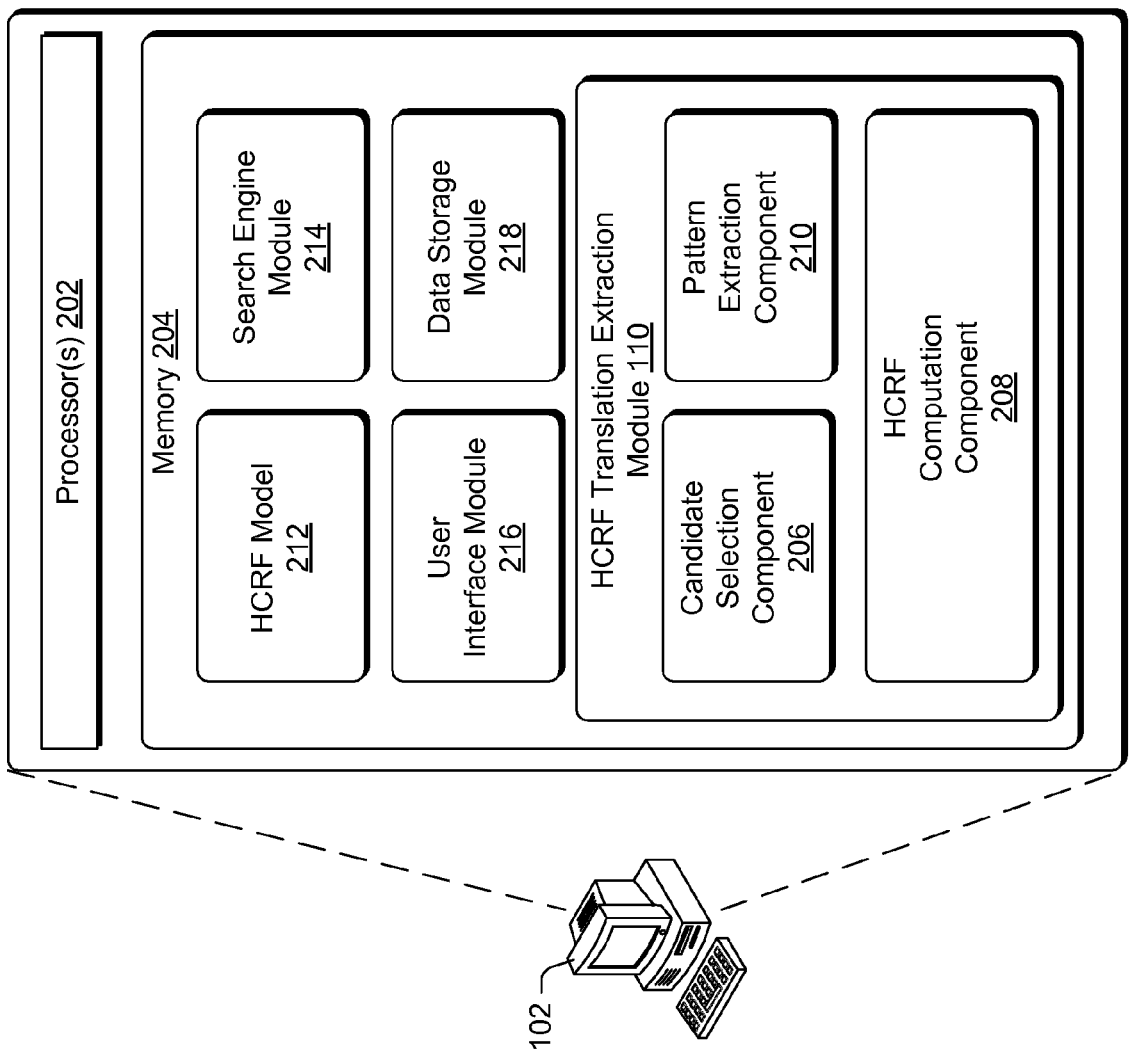
FIG. 2 shows a simplified block diagram that illustrates selected components of one example of computer device 102 that includes a Hidden Condition Random Field (HCRF) translation extraction engine, in accordance with various embodiments.

FIG. 2 illustrates selected components of one example of computer device 102 that includes the Hidden Condition Random Field (HCRF) Extraction Engine 110, in accordance with various embodiments. The computing device 102 may include one or more processors 202 and memory 204. The memory 204 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The memory 204 may store program instructions. The program instructions, or modules, may include routines, programs, objects, components, and data structures that cause components of computer 102 to perform particular tasks or implement particular abstract data types. The selected program instructions may include a HCRF translation extraction module 110 that includes a candidate selection component 206, a HCRF computation component 208, and a pattern extraction component 210. The selected program instructions may further include a HCRF model 212, a search engine module 214, a user interface module 216, and a data storage module 218.

The various modules of the computing device 102 may be configured to perform a term translation extraction. Term translation extractions are described below with respect to Chinese-English bilingual web pages that contain predominately Chinese text with sporadically interlaced English terms. However, it will be appreciated that the various modules of computing device 102 may be configured to perform term translation extraction on a variety of other bilingual web pages, where the bilingual web pages include a first language text and interlaced terms in a second language. For example, but not as a limitation, these other bilingual web pages may include bilingual web pages that are predominately English with some Chinese terms, predominately English with some Spanish, and predominately French with some English, as well as other bilingual combinations.

The candidate selection component 206 may be configured to identify a set of potential candidate translations for terms of interest in a bilingual web page. The terms of interest may include a term present in the bilingual web page that matches the search term 116 of a query, or one or more additional terms present in the bilingual web page that are of the same language as the search term 116.

For example, given a predominately Chinese web page containing some English words, a continuous English word sequence may be set as an English term $T_e$. Further, for each $T_e$, the candidate selection component 206 may locate a set of potential candidate translations that contains the Chinese word (also referred to as a Chinese term) sequence $T_c$ that is the translation for $T_e$. It will be appreciated because the majority of Chinese words are poly-syllabic, a single Chinese word is constructed from multiple Chinese characters in many instances.

In some instances, the total number of Chinese word sequences on a Chinese-English bilingual web page, such as bilingual web page 112, is quite large. However, given that in most cases the Chinese translation is close to $T_e$, the candidate selection component 206 may select only the Chinese characters within one or more finite context windows around $T_e$ to generate a set of candidate translations. This selection via finite context window is shown in FIG. 3a.

Figure 3A:
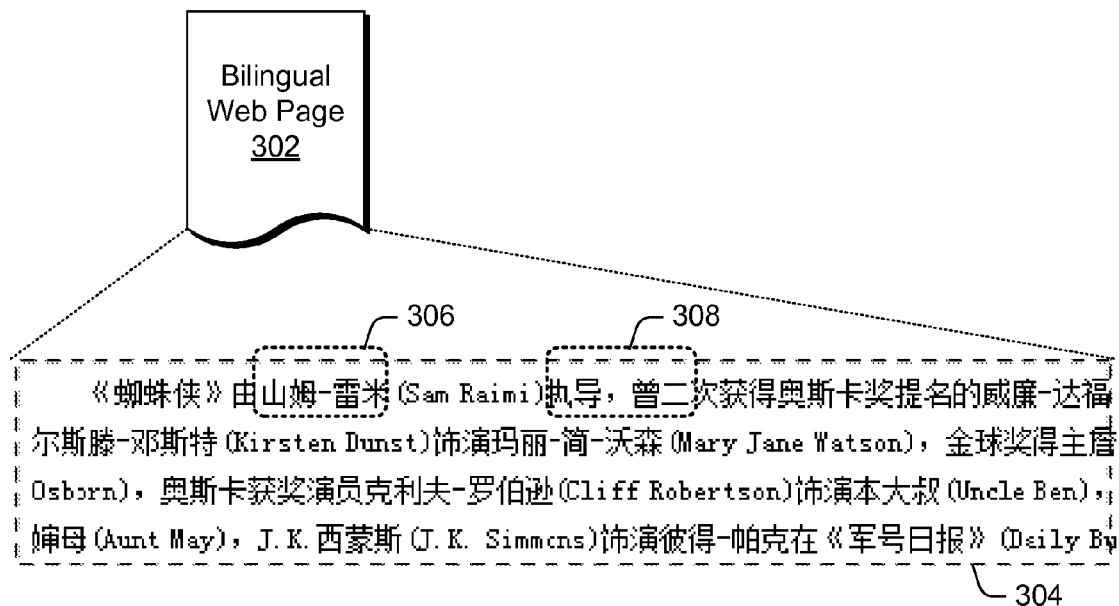
FIG. 3a illustrates an exemplary selection of Chinese characters to generate candidate translations, in accordance with various embodiments.

FIG. 3a illustrates an exemplary selection of Chinese characters to generate candidate translations by the candidate selection component 206, in accordance with various embodiments. In the example shown, given a bilingual web page 302 that includes a movie director name "Sam Raimi" in a paragraph 304 of predominately Chinese text, the candidate selection component 206 may select a predetermined number of Chinese characters before and/or after "Sam Raimi", such as sequence 306 and/or sequence 308, to generate a set of candidate translations for Sam Raimi.

In instances where a plurality of English terms are spaced closed together in a bilingual web page, the candidate selection component 206 may select Chinese characters into overlapping context windows as candidate translations for the plurality of English terms. This overlapping selection may be common since translation pairs often appear together as clusters in text blocks, as shown in FIG. 3b.

Figure 3B:
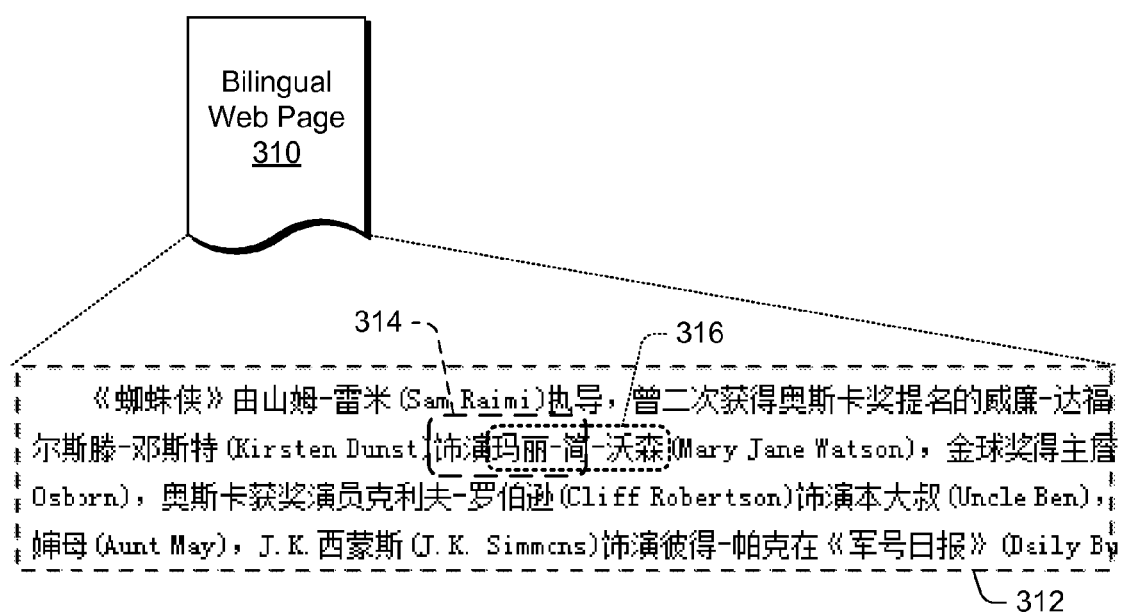
FIG. 3b illustrates the exemplary selection of Chinese characters into overlapping context windows by a computing environment for bilingual lexicon extraction, in accordance with various embodiments.

FIG. 3b illustrates the exemplary selection of Chinese characters into overlapping context windows by the candidate selection component 206, in accordance with various embodiments. In the example shown, a bilingual web page 320 includes a paragraph 312 of predominately Chinese text and a plurality of English terms. Accordingly, the candidate selection component 206 may select a finite context window of Chinese characters to generate a set of candidate translations for the actor name "Kirsten Dunst". Likewise, the candidate selection component 206 may also select a finite context window of Chinese characters to generate a set of candidate translations for the movie character name "Mary Jane Watson". This may result in the selection of Chinese character sequence 314 for the actor name "Kirsten Dunst" that overlaps the selection of Chinese characters sequence 316 for the movie character name "Mary Jane Watson."

Once the candidate selection component 206 has selected the Chinese characters within one or more finite context windows around an English term $T_e$, the candidate selection component 206 may generate the set of candidate translations for the English term $T_e$ based on the selected Chinese Characters. Such a generation process is illustrated in FIG. 3c.

FIG. 3c illustrates an exemplary generation of candidate translations for a search term by the candidate selection component 206, in accordance with various embodiments. In the example shown, the candidate selection component 206 may have selected three Chinese characters via a finite context window as containing a possible translation for the movie title 318 "Spider-Man" that is in English. Accordingly, to generate a set of candidate translations for the title "Spider-Man", the candidate selection component 206 may generate combinations of the three Chinese characters. As shown in FIG. 3c, this may generate at least a total of six unique Chinese character combinations 320 as possible Chinese word candidate translations for "Spider-Man."

Returning to FIG. 2, once the candidate translations are generated, the candidate selection component 206 may store the candidate translation into the data storage module 218.

The HCRF computation component 208 may be configured to select the most plausible translation for a search term 116 (FIG. 1) from the set of candidate translations generated by the candidate selection component 206. Moreover, the HCRF computation component 208 may provide an indicator, such as "not available (N/A)", when the HCRF computation component 208 determines that none of the candidate translations are fit to be the plausible translation for the search term 116. Accordingly, in mathematical terms, the work performed by the HCRF computation component 208 may be regarded as a classification problem. In this classification problem, if the set of all candidate translations and N/A as the possible classes, the HCRF computation component 208 is essentially asked to select the class with the highest probability. This may be illustrated as follows:

$$\bar{t} = \operatorname{argmax}_c P(c|T_e) \quad (1)$$

Where $c \in \{T_c^0, T_c^1, \ldots, T_c^n, N/A\}$.

During processing, the HCRF computation component 208 may leverage several constraints and correlations between translation pairs that are present on a bilingual web page, such as one of the bilingual web pages 114. In various embodiments, the HCRF computation component 208 may be configured to take advantage of the fact that translation pairs in a bilingual web page typically share the same layout pattern. Thus, the pattern of a known translation pair may help identify other translation pairs.

To take advantage of similarities in the layout patterns, the HCRF component 220 may learn adaptive patterns from a bilingual web page. The adaptive learning of layout patterns may be based on extraction from each candidate translation pair (i.e., the combination of a term and one of its candidate translations) a set of candidate layout patterns, from which the one or more true layout patterns may be selected. In at least one embodiment, the HCRF computation component 208 may employ the pattern extraction component 210 to extract from each candidate pair a set of candidate layout patterns.

The pattern extraction component 210 may be configured to extract candidate layout pattern from candidate translation pairs. For the purpose of discussion, the extraction of layout patterns by the pattern extraction component 210 is illustrated with respect to English terms and Chinese candidate translations. However, it will be appreciated that the pattern extraction component 210 may be configured to work on a variety of other bilingual translation pairs (e.g., English-Spanish, English-German, etc.).

In various embodiments, given a candidate translation pair of an English term and a Chinese candidate, the pattern extraction component 210 may first convert the English term and the Chinese candidate into token <eng> and <chi>. The pattern extraction component 210 may also save representations (i.e., punctuation marks, letters, characters, etc.) between the tokens <eng> and <chi>, in their original form. An example of such as a conversion is illustrated in FIG. 3d.

FIG. 3d illustrates exemplary extracted candidate layout patterns, in accordance with various embodiments. As shown in FIG. 3d, the candidate translation pair 322 may include the English term (Chinese actor name) "yun-fat chow" and the same name in Chinese characters. Accordingly, the pattern extraction component 210 may derive the candidate layout pattern 324 from the candidate translation pair 322. As shown, the pattern extraction component saved the opening quotation between <chi> and <eng> in its original form.

Further, with respect to the representation that are prior to and adjacent the candidate translation pair, the pattern extraction component 210 may determine whether or not the representation is a delimiter, that is, a representation that is not a Chinese Character, English word, or HyperText Markup Language (HTML). If the pattern extraction component 210 determines that the representation is a delimiter, the pattern extraction component 210 may save the delimiter in its original form. However, when the representation is an English word or one or more Chinese characters, the pattern extraction component 210 may convert the respective representations into the tokens <b_chi> and <b_eng>. This conversion of candidate translation pairs into candidate layout patterns is illustrated in an example of FIG. 3d.

As shown in FIG. 3d, an exemplary candidate translation pair 326 may include the Chinese characters that surround the English term "TVB". Accordingly, the pattern extraction component 210 may derive the candidate layout pattern 328. The candidate layout pattern 328 may include the token <chi> for the Chinese candidate translation (as underlined in candidate translation pair 326), the token <eng> for the English term "TVB" of candidate translation pair 326. Additionally, since the representation before the underline portion of the candidate translation 326 is not a delimiter, the pattern extraction component 210 may use the token <b_chi> to designate the representation. Further, the representation of candidate translation 326 that is between the Chinese candidate translation designated by <chi> and the English term designated by <eng> is saved in its original form.

In other embodiments, the pattern extraction component 210 may also save HTML tags into candidate layout patterns. For example, but not as a limitation, the pattern extraction component 210 may save a link reference <a href="abcd.com"> as <a>.

When one or more candidate layout patterns have been extracted from a bilingual web page, the HCRF computation component 208 may match a candidate translation pair to each of the candidate layout patterns. In various embodiments, the HCRF computation component 208 may initially match a first language term in the candidate translation pair with a corresponding token in the candidate layout pattern, and match a second language term in the candidate translation pair with a corresponding token in the candidate layout pattern. Subsequently, the representations between the first language and second language terms may be matched with their corresponding counterparts in the candidate layout pattern. Further, the representations prior to and adjacent to the candidate translation pair may be matched to a corresponding token in the candidate layout pattern. If all the portions of the candidate translation pair are capable of being matched with counterparts in the candidate layout pattern, then the HCRF computation component 208 may consider the candidate translation pair to match the particular candidate layout pattern.

For example, but not as a limitation, when the candidate translation pair includes a English term and a Chinese term, the English term may be matched with the token <eng> of the candidate layout pattern, and the Chinese term may be matched with the <chi> token of the candidate layout pattern. The representations between the English term and the Chinese term may be matched with their corresponding counterparts in the candidate layout pattern. The tokens <b_chi> or <b_eng> may be matched with one or more Chinese characters or one or more English words, respectively, that are prior to and adjacent the candidate translation pair. Assuming all the portions of the English-Chinese candidate pair match the candidate layout pattern, the HCRF computation component 208 may deem the candidate translation pair to match the particular candidate layout pattern. As further described below, the HCRF computation component 208 may integrate the process of pattern extraction with the candidate translation selection process.

In additional embodiments, the HCRF computation component 208 may be further configured to leverage the fact that a second language term in a bilingual web page generally does not serve as a translation for more than one first language term that is present in the bilingual web page. For example, a Chinese word, such as C, could be a candidate translation for multiple English terms when they are close enough to have overlapping context windows. In this example, if C is known to be the translation for one of the English terms, the HCRF computation component 208 may be constrained so that other English terms shall not take C or any Chinese word overlapping with C in its context window as its translation. In some embodiments, the HCRF computation component 208 may also take advantage of spatial order of the translation pairs. For example, if an English term $E_a$ occurs after another one $E_b$, then $E_a$'s translation should appear after $E_b$'s translation.

The HCRF computation component 208 may leverage these constraints and correlations by modeling term translation extractions from a bilingual web page as sequence labeling on all second language terms (i.e., terms in the non-dominant language of the bilingual web page). In such a model, each translation candidate may be regarded as a possible label for a second language term, and translation extraction may be formulated as choosing the most likely path of labels. The use of sequence labeling to obtain term translations is further illustrated in FIG. 4.

Figure 4:
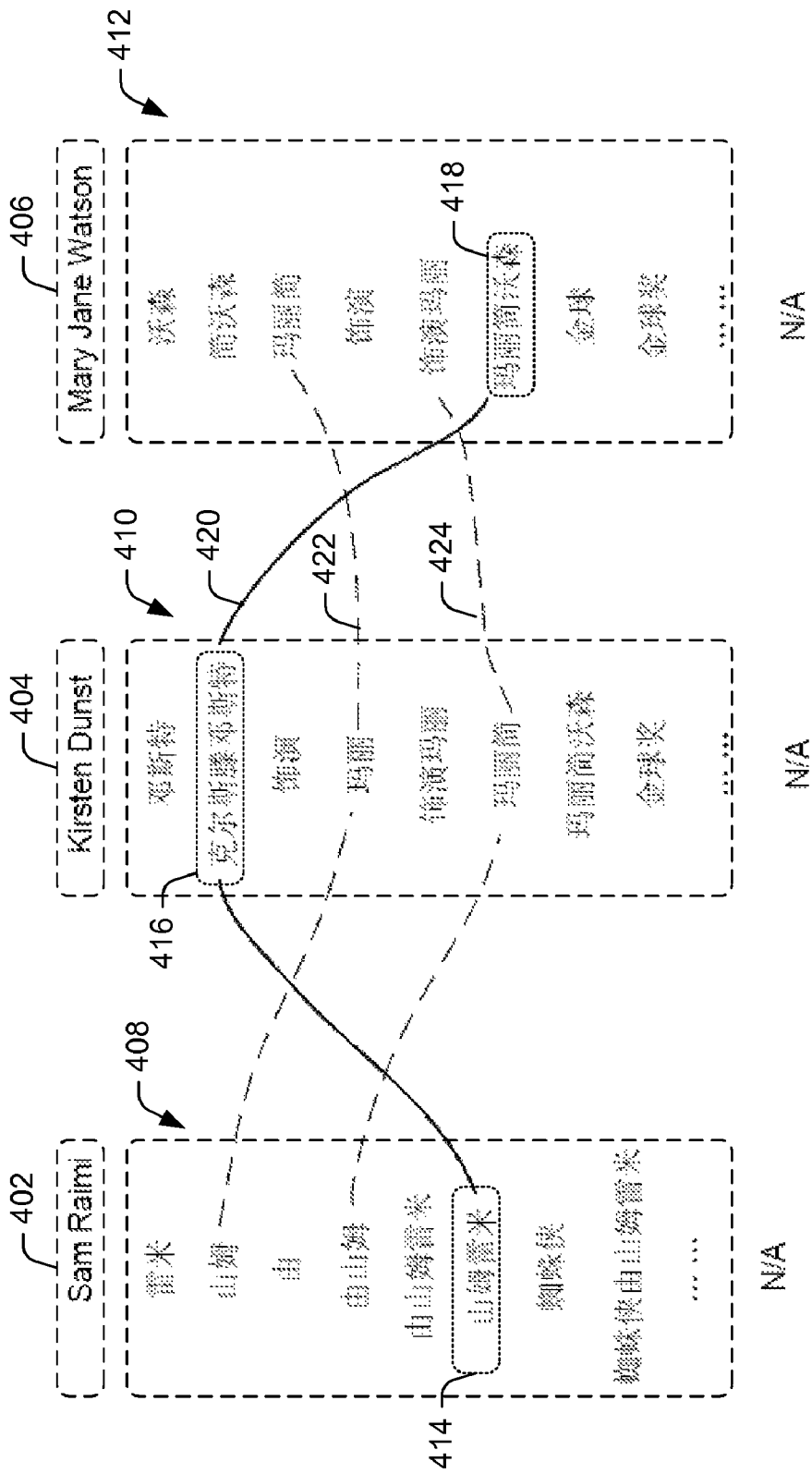
FIG. 4 illustrates an exemplary extraction of term translations by a computing environment for bilingual lexicon extraction, in accordance with various embodiments.

FIG. 4 illustrates an exemplary extraction of term translations by the HCRF computation component 208, in accordance with various embodiments. It will be appreciated that while FIG. 4 uses English and Chinese to demonstrate the operation of the HCRF computation component 208, the HCRF component 208 may also implement similar operations to extract term translations with respect to other languages.

For example, a predominately Chinese (first language) bilingual web page may include the English (second language) terms 402 (Sam Rimi), 404 (Kirsten Dunst), and 406 (Mary Jane Watson). As described above, the candidate selection component 206 may generate a set of candidate translations for each of the English terms. As shown, the candidate selection component 206 may generate a set of candidate translations 408 for the English term 402, a set of candidate translations 410 for the English term 404, and a set of candidate translations 412 for the English term 406.

Accordingly, the HCRF computation component 208 may form a plurality of label sequences via combination. In the example shown in FIG. 4, the HCRF computation component 208 may combine the candidate translation 408 of the English term 502, the candidate translation 416 of the English term 404, and the candidate translation 418 of the English term 406 as a label sequence 420. Likewise, as shown label sequence 422 and label sequence 424 may be similarly constructed by the HCRF computation component 208 with the use of a candidate translation for each of the English terms 402-406. It will be appreciated that label sequences 420, 422, and 424 are merely illustrative, and that in various embodiments, the HCRF component 208 may form a plurality of other label sequences, by which each label sequence is formed by combining a candidate translation for each of the terms. In at least one embodiment, the HCRF computation component 208 may form label sequences via all possible combinations of the candidate translations, wherein each label sequence includes one candidate translation for each original term.

Following the formation of label sequences, the HCRF computation component 208 may use the HCRF Model 212 to determine which label sequence includes the most probable term translations for the terms. In other words, the HCRF computation component 208 may determine which one of the label sequences is the most likely path of labels via the use of sequence labeling.

In order to use sequence labeling to obtain term translations, the HCRF computation component 208 may employ Hidden Conditional Random Field (HCRF), derived from Conditional Random Field (CRF), as a formalism to solve the sequence labeling problem.

Generally speaking, CRF defines the conditional probability of a label sequence S given an input sequence X, which may be represented as:

$$P_\lambda(y|x) = \frac{1}{Z_x}\exp\left(\sum_{t=1}^{T}\sum_{k}\lambda_k f_k(y_{t-1}, y_t, x, t)\right) \quad (2)$$

where $Z_x$ is the normalization factor to make the probability of all label sequences sum to 1. $f_k(y_{t-1}, y_t, x, t)$ is an arbitrary feature function over the input sequence x, the current label $y_t$ and the previous label $y_{t-1}$ when first-order Markov independence is assumed. Additionally, $\lambda$ is the weights for the features, and can be learned by maximizing the log likelihood of training examples. Inference of CRF is efficient via the Viterbi algorithm.

Accordingly, the HCRF computation component 208 may employ a HCRF model 212 that uses a modified Condition Random Field (CRF) to process the text on the bilingual web pages as observed data. The purpose of the HCRF model 212 is to label translations (or N/A) for the sequence of second language terms (e.g., English terms in predominately Chinese bilingual web pages) from their candidate translation sets.

The HCRF model 212 may include one or more features that are used for term translation extraction. In some instances, two terms are likely to be translations if many of their composing words are translations according to an existing bilingual dictionary. Accordingly, a score may be derived by dividing the number of word pairs found in the dictionary by the total number of words of both terms. The derived score, also referred to as a dictionary score, may serve as feature of the HCRF model 212.

The HCRF model 212 may also include a feature referred to as transliteration score. The transliteration score is useful for personal names, location, and organization, etc. that are transliterated based on pronunciation rather than meaning. In at least on embodiment, the transliteration probability of a pair $S^e$ and $S^f$ may be defined as:

$$Pr(S^e|S^f) = P_u \Sigma_A Pr(S^e|S^f) = P_u \Sigma_A \Pi_{c^e \epsilon s} e^{c^f \epsilon s^f} P(c^e|c^f) \quad (3)$$

where A is the alignment of their sound letters $c^e$ and $c^f$. $P(c^e|c^f)$ is the transformation probability of the aligned sound letters and is estimated via an Expectation-Maximization algorithm on a collection of proper name transliteration pairs. For example, in one embodiment, the collection may include a collection of 592,607 proper name transliteration pairs.

The HCRF model 212 may further include a feature that is referred to as a length similarity. Length similarity is based on the fact that a length of a term is often proportional to that of its translation. The normalized length difference $\delta(x,y)$ of the terms x and y may be considered to be normal distribution N(0,1). Accordingly:

$$\delta = \frac{y - x \cdot c}{\sqrt{(x+1)\sigma^2}} \quad (4)$$

where c is a constant indicating the average length ratio between target and source terms, and $\sigma^2$ is the variance of length difference. Furthermore, since translations usually occur close to the original term, the number of words between the original term and the translation candidate may be counted. This count may be employed as a distance proximity feature of the HCRF model 212.

Web co-occurrence may also be a feature of the HCRF model 212. Accordingly, the HCRF model 212 may employ a search engine, such as search engine 108, to search the Web for snippets (e.g., text blocks of predetermined lengths) that include second language terms of a bilingual web page. The returned snippets are examined for the occurrence of the candidate translation. Thus, the more frequent the occurrence of the candidate translation in the snippets, the more likely that it is the true translation of the second language term.

The product of symmetric conditional probability (SCP) and context dependency (CD), referred to as SCPCD, may be included as another feature of the HCRF model 212. The purpose of the SCPCD is to identify the lexical boundaries of terms. SCP may be defined as follows:

$$SCP(w_1 \ldots w_n) = (y \mid x) = \frac{freq(w_1 \ldots w_n)^2}{\frac{1}{n-1}\sum_{i=1}^{n-1} freq(w_1 \ldots w_n) \cdot freq(w_{i+1} \ldots w_n)} \quad (5)$$

where $w_1 \ldots w_n$ is the word n-gram and $freq(w_1 \ldots w_n)$ is the frequency of the n-gram on the returned snippets. Further, CD measures whether the n-gram could be merged with its context to form an independent term. It may be defined as:

$$CD(w_1 \ldots w_n) = (y \mid x) = \frac{LC(w_1 \ldots w_n) \cdot RC(w_1 \ldots w_n)}{freq(w_1 \ldots w_n)^2} \quad (6)$$

where $LC(w_1 \ldots w_n)$ or $RC(w_1 \ldots w_n)$ is the number of unique left (or right) adjacent words.

The CRF model may also include a feature known as context similarity. Context similarity is based on the idea that the term and its translation should have similar context in their own languages. The context vector is constructed by collecting the context words weighted by their tf-idf scores in monolingual search snippets. The similarity between a query term s and the translation candidate t may be estimated with the cosine measure of their context vectors:

$$S_{cv}(s,t) = cosine(cv_s, cv_t) \quad (7)$$

In various embodiments, the context similarity may be complementary to the web co-occurrence feature when co-occurrence count of the pair is low.

The translation feature, which is another feature that may be included in the HCRF model 212, is aimed to capture the non-overlapping and spatial order constraints between translation pairs. For example, but not as a limitation, given T as the selected translation of the previous English term, this feature indicates whether the translation candidate for the current English term appears after T on the page. If yes, a value of the feature is set to 1, and if the current English term overlaps with T or appears before it, the feature value is set to −1.

The HCRF model 212 in this example can learn from training data that most of the labeled term translation pairs comply with the constraints and therefore infer that pairs violating the constraints will receive a penalty. The only exception is the case of N/A. If an English term chooses N/A, the selected translation of the previous English term is then used for the next English term to compute its transition feature. This process may be recursive in case the previous English term also chooses N/A. For all terms choosing N/A, the HCRF computation component may save the label of the previous terms.

As described above, the HCRF computation component 208 may employ Hidden Conditional Random Field (HCRF), as encapsulated to in the HCRF model 212, to process the text on the bilingual web pages as observed data.

The extension of CRF into HCRF involves the introduction of a hidden variable h to represent the pattern used for translation on a bilingual page. The use of hidden variables eliminates the need for a-priori pattern classification. Rather, the hidden variable h's value can be chosen from a finite set of extracted candidate patterns so that all candidate patterns have the potential of influencing term translation extraction. In various embodiments, the HCRF model 212 may accommodate multiple valid patterns on a single page and avoid taking prudent classification over patterns.

In the HCRF model 212, the conditional probability of a sequence of translation labels, such as one of the labels sequences 420, 422, and 424 shown in FIG. 4, may take the form:

$$P_\lambda(y \mid x) = \sum_h P_\lambda(y, h \mid x) = \frac{1}{z_x} \exp\left(\sum_h \sum_{t=1}^{T} \sum_k \lambda_k f_k(y_{t-1}, y_t, x, t)\right) \quad (8)$$

where the probability of a sequence labeling is the summation of the probability of labeling translations for all the candidate patterns h. Arbitrary feature function can be defined on the observed input x, the label and transition $y_t$ and $y_{t-1}$, as well as the hidden variable h.

The pattern feature in the HCRF model 212 may be defined as taking the pattern probability calculated by a Maximum Entropy (ME) model if the pair fit the pattern as the value of h, or 0 if it does not fit h. The parameter $\lambda$ of the HCRF model 212 may be trained by the following objection function:

$$L(\lambda) = \sum_{i=1}^{n} \log P(y_i \mid x_i, \lambda) - \frac{1}{2\sigma^2}\|\lambda\|^2 \quad (9)$$

where n is the total number of training sequences. The first term in equation 9 is the log-likelihood of the data; the second term is the log of a Gaussian prior with variance $\sigma^2$. Gradient ascent may be used to search for the optimal parameter values $\lambda^* = \text{argmax}_\lambda L(\lambda)$. In at least one embodiment, Quasi-Newton optimization technique may be employed for the search.

The annotated data for the training of the HCRF model 212 consists of bilingual web pages where the sequences of translation pairs are manually labeled. Since the pattern h is a hidden variable, it not necessary to explicitly label patterns in the training data. Efficient inference is dynamic programming similar to CRF with an additional summation over features involving hidden variables.

The search engine module 214 may be configured to provide a web search engine, such as the search engine 108. In various embodiments, the web search engine module 214 may include an application interface that enables it to conduct searches via an existing publicly available web search engine (e.g., Live Search provided by the Microsoft Corporation of Redmond, Wash., Google of Mountain View, Calif., Yahoo! Search provided by Yahoo! of Sunnyvale, Calif., etc.). In other embodiments, the search engine module 214 may be configured to provide a custom web search engine.

The user interface module 216 may interact with a user via a user interface (not shown). The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods.

The user interface module 216 may be configured to enable a user to provide input to the search engine module 214 that includes a search term, trigger words to be used with the search term, as well as whether and the number of times the derived translation results are to be used recursively for performing additional searches. Additionally, the user interface module 216 may be further configured to cause the display to output translation results, as extracted by the HCRF translation extraction module 110, to the user.

The data storage module 218 may be configured to store data in a portion of memory 204 (e.g., a database). In various embodiments, the data storage module 218 may include the lexicon repository 124, and may be further configured to store downloaded web pages 120, as well as candidate translation pairs, candidate layout patterns, feature data for the HCRF model 212, and training data for the HCRF model 212. The data storage module 218 may also be configured to store any additional data derived the search term 108 and the downloaded web pages 120, such as any intermediary data produced by the HCRF translation extraction module 110.

Exemplary Process

Figure 5:
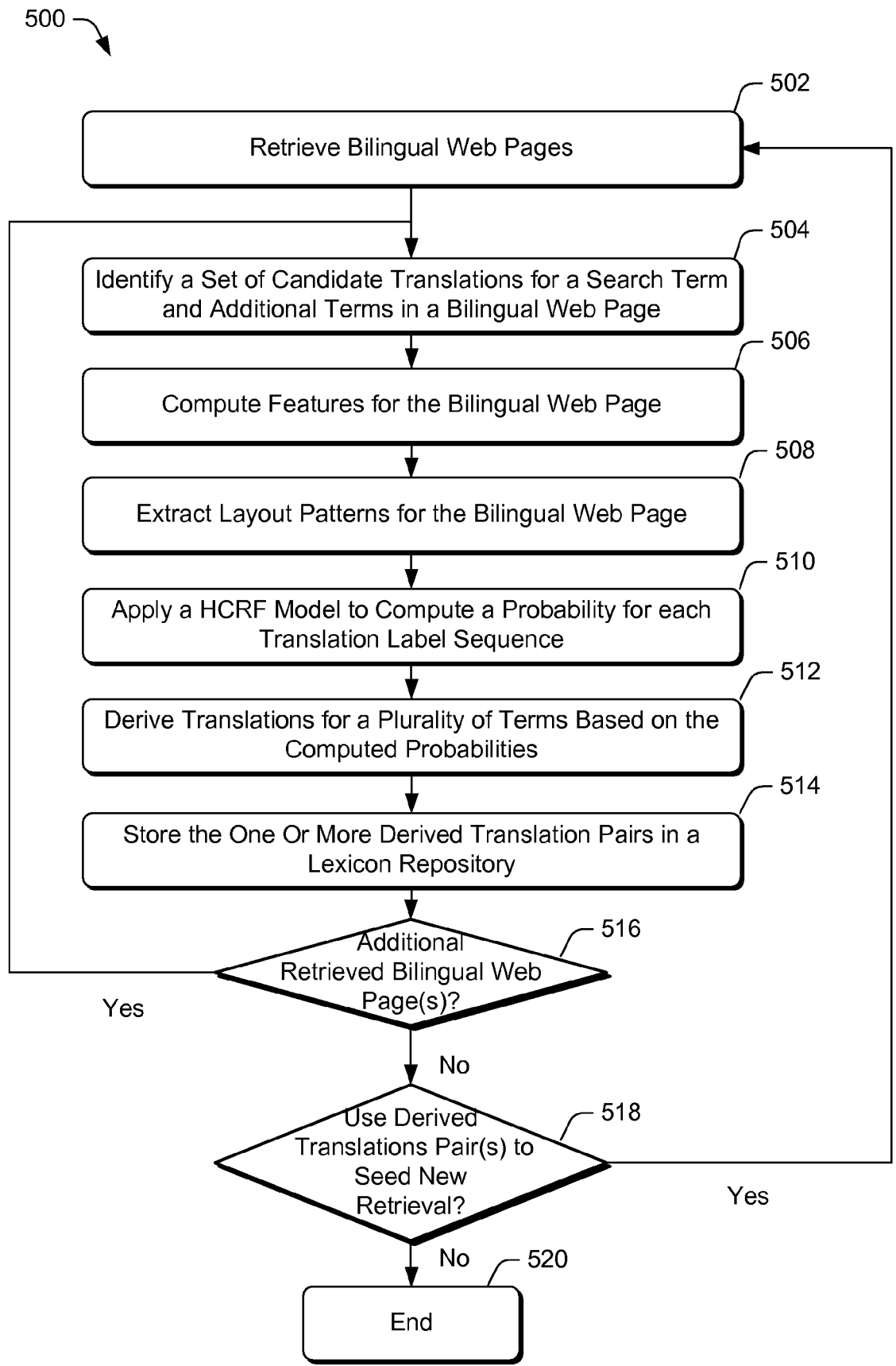
FIG. 5 shows a flow diagram illustrating an exemplary process that facilitates integration of translation term extraction with the adaptive learning of multiple extraction patterns in bilingual web page, in accordance with various embodiments.

FIG. 5 illustrates an exemplary process 500 that facilitates integration of translation term extraction with the adaptive learning of multiple extraction patterns in bilingual web page, in accordance with various embodiments. The exemplary process in FIGURES is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the exemplary computing device 102 of FIG. 1, although it may be implemented in other system architectures.

At block 502, the search engine 108 may retrieve one or more bilingual web pages from the Web. The translation term search may be implemented via the search engine 108 using a search term. In some embodiments, the search term may be in a first language that is to be translated to a second language. In other embodiments, the search term may be a translation pair that includes a first word or phrase in a first language, and a second word or phrase that is a suspected translation in a second language for the first term. In additional embodiments, the translation term search may be implemented on the search engine 108 using a combination of the search term with trigger words. The trigger words may include words that specifically trigger the search engine 108 to retrieve bilingual web pages that include the search term.

At block 504, the candidate selection component 206 may be configured to select a set of candidate translations for the search term, as well as candidate translations for additional terms that are in the same language as the search term, from a bilingual web page. In various embodiments, the candidate selection component 206 may construct the set of candidate translations for each term by deriving combinations of words or characters that are selected via a context window.

At block 506, the HCRF computation component 208 may compute one or more features that facilitate term translation extraction. In various embodiments, the one or more features computed by the HCRF computation component 208 include at least one of a dictionary score, a transliteration score, length similarity, distance proximity, web co-occurrence, a product of symmetric conditional probability (SCP) and context dependency (CD), context similarity, and transition feature.

At block 508, the pattern extraction component 210 may extract one or more candidate layout patterns from each candidate translation pair. The candidate layout patterns may be used by the HCRF computation component 208 to influence term translation extraction.

At block 510, the HCRF computation component 208 may apply the HCRF model 212 that includes a hidden variable h and takes into account one or more of the computed features. The hidden variable h may represent the translation layout patterns used by the translation pairs on the bilingual web page. The hidden variable h's value may choose from the finite set of candidate patterns, as extracted by the pattern extraction component 210, so that all candidate patterns have the potential of influencing term translation extraction. The HCRF model 212 may accommodate multiple valid patterns on a single page. By using the HCRF model 212 that includes the hidden variable h that takes into account one or more of the computed features, the HCRF computation component 208 may compute a probability for each sequence of translation labels as containing the most likely translations.

In various embodiments, the HCRF model 212 may be trained prior to being applied by the HCRF computation component 208. In at least one embodiment, the data for training the HCRF may include of bilingual web pages where the sequences of translation pairs are manually labeled.

At block 512, the HCRF computation component 208 may derive term translation pairs based on the probability for each sequence of translation labels. In at least one embodiment, the HCRF computation component 208 may select the translation label sequence with the highest computed probability to derive the term translation terms. For example, referring back to FIG. 4, the HCRF computation 208 may have computed that the probability of label sequence 420 containing the most likely translations is higher than the probabilities of label sequence 504 and translation label sequence 506. Accordingly, the HCRF computation component may pair the candidate translation 414 with the term 402 (Sam Raimi), pair the candidate translation 420 with the term 404 (Kirsten Dunst), and pair the candidate translation 418 with the term 406 (Mary Jane Watson).

At block 514, the data storage module 218 may store one or more derived translation pairs into a database, such as the lexicon repository 124 (FIG. 1), wherein each translation pair includes an original term and the most probable candidate translation. In some embodiments, the data storage module 218 may be configured to only store the translation pair that includes the original search term. However, in other embodiments, the data store module 218 may be configured to store every translation pair derived.

In various embodiments, the data storage module 218 may enable the retrieval of the one or more stored translation pairs via the user interface module 216 (FIG. 2) so that a term translation for the original term of a translation pair may be presented to a user through a user interface. For example, but not as a limitation, at least one of the term translation and the original term may be presented to a user as part of a bilingual web search results and/or a document translation.

At decision block 516, the HCRF translation extraction module 110 may determine whether there are one or more additional retrieved bilingual web pages to be processed for obtaining further translations of the original term. If the HCRF translation extraction module 110 determines there are additional bilingual web pages are to be processed ("yes") at decision block 516, the process 500 may loop back to block 504, where an additional bilingual web page may be processed.

However, if the HCRF translation extraction module 110 determines there are no additional bilingual web pages to be processed ("no" at decision block 516), the process 500 may continue to decision block 518.

At decision block 518, the HCRF translation extraction module 118 may determine whether the one or more derived translation pairs should be used to recursively seed a new retrieval. In various embodiments, the decision to seed a new retrieval may be based on whether a predetermined number of recursive cycles have been met or whether all bilingual web pages containing the original search term of a particular translation pair have been retrieved.

If the HCRF translation extraction module 110 determines that a new bilingual web page retrieval should be performed ("yes" at decision block 518), the process 500 may loop back to block 502, where additional bilingual web pages may be retrieved using at least one of the previously derived translation pairs. However, if the HCRF translation extraction module 110 determines that no new retrieval should be performed ("no" at decision block 518), the process 500 may terminate at block 520.

Exemplary Computing Environment

Figure 6:
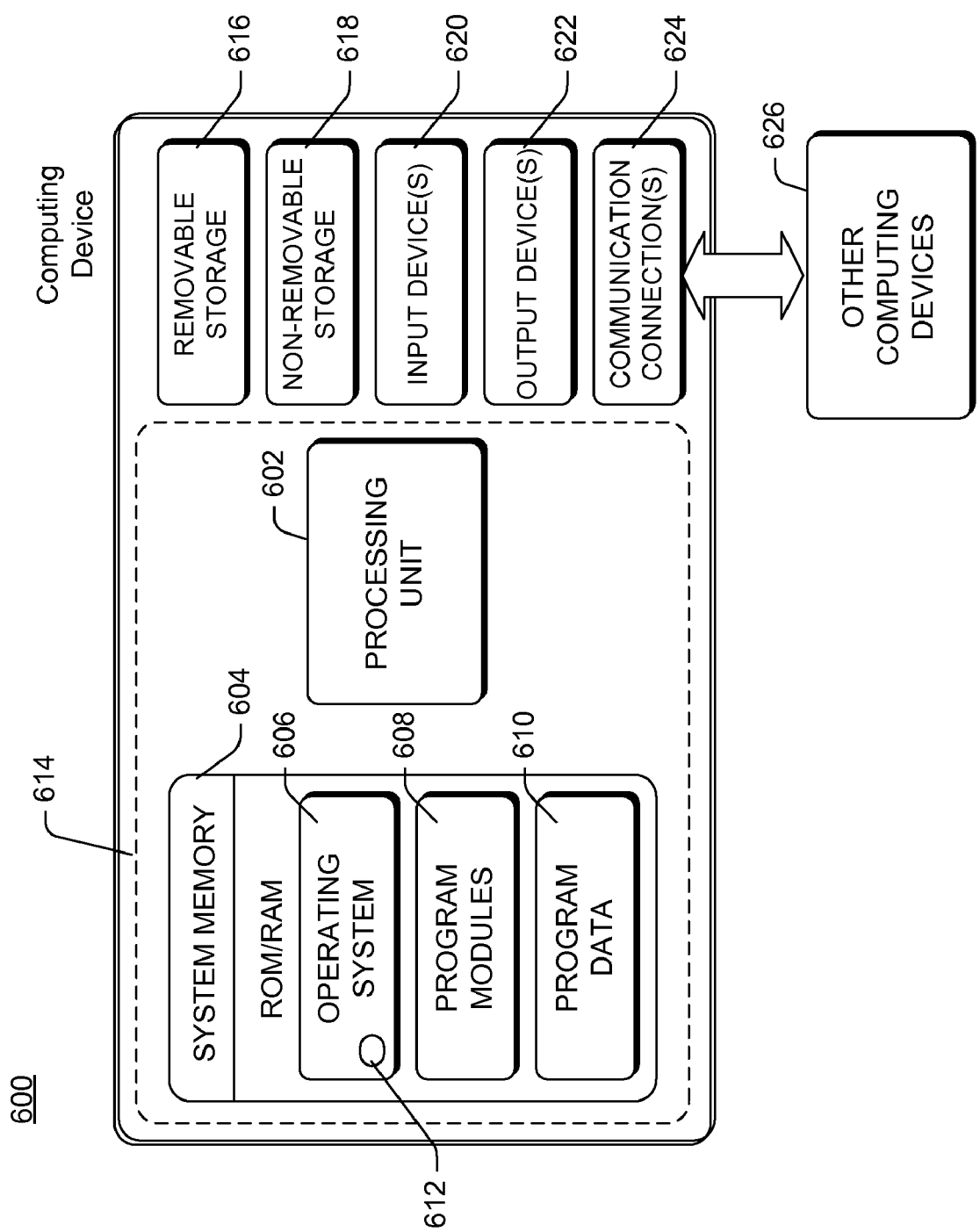
FIG. 6 illustrates a representative computing system that is used to implement techniques and mechanisms for adaptively learning extraction pattern rules of each bilingual web page to facilitate the mining of bilingual lexicon.

FIG. 6 illustrates a representative computing system 600 that is used to implement techniques and mechanisms for adaptively learning extraction pattern rules of each bilingual web page to facilitate the mining of bilingual lexicon, that is, term translations, from a plurality of web pages. The computing device 102, as described in FIG. 1, may be implemented using the computing system 600. However, it will readily appreciate that the techniques and mechanisms may be implemented in other computing devices, systems, and environments. The computing system 600 shown in FIG. 6 is only one example of a computing device and is not intended to suggest any limitation as to the scope of use or functionality of the computer and network architectures. Neither should the computing system 600 be interpreted as having any dependency or requirement relating to any one or combination of components illustrated in the example computing device.

In a very basic configuration, Computing system 600 typically includes at least one processing unit 602 and system memory 604. Depending on the exact configuration and type of computing device, system memory 604 may be volatile (such as RAM), non-volatile (such as ROM, flash memory, etc.) or some combination of the two. System memory 604 typically includes an operating system 606, one or more program modules 608, and may include program data 610.

The operating system 606 includes a component-based framework 612 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 600 is of a very basic configuration demarcated by a dashed line 614. Again, a terminal may have fewer components but will interact with a computing device that may have such a basic configuration.

Computing system 600 may have additional features or functionality. For example, Computing system 600 may also include additional data storage devices (removable and/or non-removable) such as, for example, magnetic disks, optical disks, or tape. Such additional storage is illustrated in FIG. 6 by removable storage 616 and non-removable storage 618. Computer storage media may include volatile and nonvolatile, removable and non-removable media implemented in any method or technology for storage of information, such as computer readable instructions, data structures, program modules, or other data. System memory 604, removable storage 616 and non-removable storage 618 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Computing system 600. Any such computer storage media may be part of device 600. Computing system 600 may also have input device(s) 620 such as keyboard, mouse, pen, voice input device, touch input device, etc. Output device(s) 622 such as a display, speakers, printer, etc. may also be included. These devices are well known in the art and are not discussed at length here.

Computing system 600 may also contain communication connections 624 that allow the device to communicate with other computing devices 626, such as over a network. These networks may include wired networks as well as wireless networks. Communication connections 624 are some examples of communication media. Communication media may typically be embodied by computer readable instructions, data structures, program modules, etc.

It is appreciated that the illustrated Computing system 600 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The integration of translation term extraction with the adaptive learning of multiple extraction patterns in bilingual web page may improve translation term mining and recall while reducing the need to manually define translation term layout pattern rules. Moreover, the use of sequence labeling via Hidden Conditional Random Field (HCRF) to extract term translations may increase mining precision. Thus, embodiments in accordance with this disclosure may improve the efficiency of translation term extraction for bilingual web pages.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A system, comprising:
   a search engine component to retrieve one or more bilingual web pages, each bilingual web page including a plurality of terms that comprise a search term and one or more additional terms in a first language;
   a candidate selection component to form a plurality of candidate translation pairs by selecting one or more candidate translations for each of the plurality of terms and pairing one of the one or more candidate translations and one of the plurality of terms;
   a pattern extraction component to adaptively extract one or more translation layout patterns from the plurality of candidate translation pairs;
   a hidden conditional random field (HCRF) computation component to derive a term translation in a second language for the search term in the first language based on the one or more candidate translations using an HCRF model, the one or more translation layout patterns, and one or more features, the HCRF model including a hidden variable that represents the one or more a translation layout patterns; and
   a data storage component to store the term translation in a lexicon repository.

2. The system of claim 1, wherein the HCRF computation component is to derive the term translation by:
   forming a plurality of label sequences based on the one or more candidate translations, the one or more translation layout patterns, and one or more features;
   computing a probability for each label sequence that indicates likelihood that the label sequence contains the term translation; and
   obtaining the term translation from one of the plurality label sequences that has a highest probability.

3. The system of claim 1, wherein the HCRF computation component is to further compute the one or more features, the one or more features including at least one of a dictionary score feature, a transliteration score feature, a length similarity feature, a distance proximity feature, a web co-occurrence feature, a symmetric conditional probability (SCP)/Context Dependency (CD) feature, a context similarity feature, and a transition feature.

4. The system of claim 1, wherein the search engine is to retrieve the one or more bilingual web pages using a query that includes the search term.

5. The system of claim 1, wherein the search engine is to recursively retrieve one or more additional bilingual web pages using a query that includes a pairing of the search term and the term translation.

6. The system of claim 1, wherein the search engine is to retrieve the one or more bilingual web pages using a query based on the search term and one or more trigger words.

7. The system of claim 1, wherein at least one of the translation layout patterns includes a representation of a hyperlink reference.

8. The system of claim 1, wherein the candidate selection component is to further select one or more candidate translations for each of the plurality of terms from words within a context window.

9. A method, comprising:
   retrieving one or more bilingual web pages from at least one website using a search engine that is executed on a computing device, each bilingual web page including a plurality of terms that comprise a search term and one or more additional terms in a first language;
   forming a plurality of candidate translation pairs by selecting one or more candidate translations for each of the plurality of terms, and creating each candidate translation pair by pairing one of the one or more candidate translations and a corresponding term of the plurality of terms;
   extracting one or more translation layout patterns from the plurality of candidate translation pairs;
   computing one or more features based on at least one of the terms using the computing device, the one or more features including a context similarity feature that compares a similarity between a context of a term in the first language and a context of a corresponding candidate translation in a second language;
   deriving a term translation in the second language for the search term in the first language based on a hidden conditional random field (HCRF) model stored on the computing device that includes the one or more candidate translations, the one or more translation layout patterns, and the one or more features, the HCRF model including a hidden variable that represents the one or more translation layout patterns; and
   storing the term translation in a lexicon repository.

10. The method of claim 9, further comprising displaying the term translation to a user.

11. The method of claim 9, further comprising retrieving one or more additional bilingual web pages using a query that includes a pairing of the search term and the term translation.

12. The method of claim 9, wherein the deriving includes:
    forming a plurality of label sequences based on the one or more candidate translations, the one or more translation layout patterns, and one or more features;
    computing a probability for each label sequence that indicates likelihood that the label sequence contains the term translation; and
    obtaining the term translation from one of the plurality label sequences that has a highest probability.

13. The method of claim 9, wherein the computing includes further computing at least one of a dictionary score feature, a transliteration score feature, a length similarity feature, a distance proximity feature, a web co-occurrence feature, a symmetric conditional probability (SCP)/Context Dependency (CD) feature, or a transition feature.

14. The method of claim 9, wherein the retrieving includes retrieving the one or more bilingual web pages using a query that includes the search term.

15. The method of claim 9, wherein the retrieving includes retrieving the one or more bilingual web pages using a query based on the search term and one or more trigger words.

16. The method of claim 9, wherein the HCRF model includes a hidden variable that represents the one or more translation layout patterns.

17. The method of claim 9, wherein the forming includes selecting the one or more candidate translations for each of the plurality of terms from words within a context window.

18. A tangible computer readable memory storing computer-executable instructions that, when executed, cause one or more processors to perform acts comprising:

retrieving one or more bilingual web pages based at least on a search term, each bilingual web page including a plurality of terms that comprise the search term and one or more additional terms in a first language;

forming a plurality of candidate translation pairs by selecting one or more candidate translations for each of the plurality of terms, and forming each candidate translation pair by including one of the one or more candidate translations and one of the plurality of terms;

extracting one or more translation layout patterns from the plurality of candidate translation pairs;

computing one or more features based on the plurality of terms, the one or more features including a feature that identifies lexical boundaries of terms, the feature being a product of a symmetric conditional probability and a context dependency that are derived from frequencies of words in the plurality of terms;

deriving a term translation in a second language for the search term in the first language based on a hidden conditional random field (HCRF) model that includes the one or more candidate translations, the one or more translation layout patterns, and the one or more features, the HCRF model including a hidden variable that represents the one or more translation layout patterns; and displaying the term translation and the search term to a user.

19. The tangible computer readable memory of claim 18, wherein the deriving includes:

forming a plurality of label sequences based on the one or more candidate translations, the one or more translation layout patterns, and one or more features;

computing a probability for each label sequence that indicates likelihood that the label sequence contains the term translation; and obtaining the term translation from one of the plurality label sequences that has a highest probability.

20. The tangible computer readable memory of claim 18, wherein the retrieving includes retrieve the one or more bilingual web pages using a query based on the search term and one or more trigger words.

* * * * *